United States Patent
Dossi et al.

(10) Patent No.: US 11,279,788 B2
(45) Date of Patent: Mar. 22, 2022

(54) PERFLUORINATED THERMOPLASTIC ELASTOMER

(71) Applicant: SOLVAY SPECIALTY POLYMERS ITALY S.P.A., Bollate (IT)

(72) Inventors: Marco Dossi, Milan (IT); Marco Avataneo, Milan (IT); Pasqua Colaianna, Milan (IT); Claudia Manzoni, Bologna (IT)

(73) Assignee: SOLVAY SPECIALTY POLYMERS ITALY S.P.A., Bollate (IT)

(*) Notice: Subject to any disclaimer, the term of this patent is extended or adjusted under 35 U.S.C. 154(b) by 279 days.

(21) Appl. No.: 16/486,701

(22) PCT Filed: Feb. 9, 2018

(86) PCT No.: PCT/EP2018/053338
§ 371 (c)(1),
(2) Date: Aug. 16, 2019

(87) PCT Pub. No.: WO2018/149757
PCT Pub. Date: Aug. 23, 2018

(65) Prior Publication Data
US 2021/0139630 A1    May 13, 2021

(30) Foreign Application Priority Data

Feb. 16, 2017 (EP) .................... 17156540

(51) Int. Cl.
| C08F 293/00 | (2006.01) |
| B33Y 70/00 | (2020.01) |
| B29C 64/40 | (2017.01) |
| B29C 64/106 | (2017.01) |
| B33Y 10/00 | (2015.01) |
| B29K 27/12 | (2006.01) |

(52) U.S. Cl.
CPC ........ C08F 293/005 (2013.01); B29C 64/106 (2017.08); B29C 64/40 (2017.08); B33Y 70/00 (2014.12); *B29K 2027/12* (2013.01); *B33Y 10/00* (2014.12); *C08F 2438/00* (2013.01)

(58) Field of Classification Search
CPC ..... B29C 64/40; B29C 64/106; B29C 64/124; B29C 64/188; B29C 64/386; B33Y 10/00; B33Y 70/00; B33Y 50/00; C08F 2438/00; C08F 293/005; C08F 214/26; C08F 214/262; B29K 2027/12
See application file for complete search history.

(56) References Cited

U.S. PATENT DOCUMENTS

| 2,515,628 | A | 7/1950 | Castle |
| 2,520,338 | A | 8/1950 | Robertson |
| 4,864,006 | A | 9/1989 | Giannetti et al. |
| 5,173,553 | A | 12/1992 | Albano et al. |
| 5,605,971 | A | 2/1997 | Arcella et al. |
| 5,612,419 | A | 3/1997 | Arcella et al. |
| 6,207,758 | B1 | 3/2001 | Brinati et al. |
| 2018/0194888 | A1* | 7/2018 | Mitchell ............... C08F 16/24 |

FOREIGN PATENT DOCUMENTS

| EP | 625526 A1 | 11/1994 |
| EP | 1029875 A1 | 8/2000 |
| EP | 1209176 A1 | 5/2002 |
| WO | 2007133912 A2 | 11/2007 |
| WO | 2018149758 A1 | 8/2018 |

OTHER PUBLICATIONS

Standard ASTM D3418, "Standard Test Method for Transition Temperatures and Enthalpies of Fusion and Crystallization of Polymers by Differential Scanning Calorimetry", 2008, p. 1-7.

* cited by examiner

*Primary Examiner* — Mark A Osele
*Assistant Examiner* — Evan T Hulting
(74) *Attorney, Agent, or Firm* — Osha Bergman Watanabe & Burton LLP

(57) ABSTRACT

The invention pertains to certain perfluorinated thermoplastic elastomers suitable for being processed through additive manufacturing techniques, thanks to their surprising ability to possess better processability (notably more significant shear thinning at processability temperature) than corresponding perfluorinated thermoplasts, which possess similar product profile and hence performances, offering hence advantages in throughput and part design accurate control, containment of degradation, reduction of fumes, and yet delivering parts with outstanding chemical resistance.

24 Claims, No Drawings

PERFLUORINATED THERMOPLASTIC ELASTOMER

CROSS-REFERENCE TO RELATED APPLICATION

This application is a U.S. national stage entry under 35 U.S.C. § 371 of International Application No. PCT/EP2018/053338 filed Feb. 9, 2018, which claims priority to European application No. EP 17156540.1, filed Feb. 16, 2017. The entire contents of these applications are explicitly incorporated herein by this reference.

TECHNICAL FIELD

Additive manufacturing technologies, otherwise often referred as 3D printing techniques, including in particular filament fabrication techniques, have rapidly evolved during the past few years, in particular in the field of prototyping, and have gained enormous success because of their well-known advantages in terms of flexibility, accessibility of designs that simply could not be produced physically in any other way, mass customization, tool-less approaches, and sustainability profile.

Additive manufacturing systems are generally used to print or otherwise build 3D parts from digital representations of the 3D parts using one or more additive manufacturing techniques. Examples of commercially available additive manufacturing techniques include extrusion-based techniques, jetting, selective laser sintering, powder/binder jetting, electron-beam melting, and stereolithography processes. For each of these techniques, a digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

A variety of materials, thermoplasts or thermosets, have been proposed, and are already presently supplied under different forms, for use in 3D printing devices, including notably under the form of filaments for use in fused filament additive manufacturing devices.

Within this area, fluoromaterials are attracting increasing attention because of their performances' profile which may cope with requirements for being used in 3D printing processes.

Indeed, fluorinated and fully fluorinated plastomeric materials display high thermal and chemical resistance if compared with non-fluorinated plastics typically used in 3D printing.

Now, perfluoropolymers have to be printed at high temperatures, varying between 200° C. and 450° C. Under these conditions, HF and other acid and by-products can be generated by thermal degradation of the fluorinated polymers with any of the possible following drawbacks:
- release in the atmosphere of harmful chemicals;
- corrosion of metal components of the 3D printer;
- polymer discoloration;
- chemical attack towards other polymers and materials (like silica).

There is hence a need for fluorinated polymers and, in particular, fully fluorinated polymers which display the chemical and thermal resistance of fluorinated plastics but with possess improved processing performances, so that they can be melt processed at lower temperature and used in a 3D printer.

On the other side, segmented fluorinated block copolymers are generally known in the art. For instance, notably U.S. Pat. No. 5,605,971 (AUSIMONT SPA) 25 Feb. 1997, U.S. Pat. No. 5,612,419 (AUSIMONT SPA) 18 Mar. 1997, U.S. Pat. No. 6,207,758 (AUSIMONT SPA) 27 Mar. 2001 disclose fluorinated thermoplastic elastomers including plastomeric segment and elastomeric segment, whereas elastomeric segments may be of different types, including e.g. segments including vinylidene fluoride (VDF) recurring units and/or segments including tetrafluoroethylene (TFE) recurring units and whereas plastomeric segment may equally be of different types, such as segments comprising TFE units, segments comprising VDF units, segments comprising ethylene, propylene or isobutylene units, in combination with other units.

Further, EP 1209875 A (DAIKIN INDUSTRIES) 29 May 2002 is directed to a fluorine-containing multi-segment polymer having an elastomeric fluorine-containing polymer chain segment and a non-elastomeric fluorine-containing polymer chain segment, in which the elastomeric fluorine-containing polymer chain segment imparts flexibility to the whole polymer and has perhaloolefin units as a recurring unit in an amount of not less than 95 percent by mole. The following combinations of blocks are specifically described:

| Elastomer components | TFE/PMVE | TFE/PMVE | TFE/PMVE | TFE/PMVE | TFE/PMVE |
|---|---|---|---|---|---|
| Non-elastomer components | TFE/PPVE | TFE/PPVE | TFE | TFE/CNVE | VdF |
| Elastomer components | TFE/PMVE | TFE/PMVE | VdF/TFE/HFP | TFE/PMVE | |
| Non-elastomer components | TFE/Et/HFP | TFE | TFE | TFE/PPVE | |

Similarly, EP 1209176 A (DAIKIN INDUSTRIES) 29 May 2002 is directed to a flexible fluorine-containing material comprising (a) a fluorine-containing multi-segment polymer having the elastomeric fluorine-containing polymer chain segment A and the non-elastomeric fluorine-containing polymer chain segment B in which the elastomeric fluorine-containing polymer chain segment A comprises not less than 90 percent by mole of a perhaloolefin unit and (b) the fluorine-containing resin having a crystalline melting point or glass transition temperature of not less than 150° C., in which a weight ratio (a)/(b) is 1/99 to 99/1. The following combinations of blocks are specifically disclosed:

| Elastomeric segment | TFE/PMVE | TFE/PMVE | — | TFE/PMVE |
|---|---|---|---|---|
| A (% by mole) | (61/39) | (64/36) | | (61/39) |
| Non-elastomeric segment | TFE/PPVE | TFE/PPVE | — | — |
| B (% by mole) | (98/2) | (98/2) | | |

| | | | | |
|---|---|---|---|---|
| Proportion of B in (a) (% by weight) | 17 | 33 | — | 0 |

SUMMARY OF INVENTION

The Applicant has now surprisingly found that certain perfluorinated thermoplastic elastomers, as below detailed, are such to address and cope the challenging requirements expressed above for being processed through additive manufacturing techniques, thanks to their surprising ability to possess better processability (notably more significant shear thinning at processability temperature) than corresponding perfluorinated thermoplasts, which possess similar product profile and hence performances, offering hence advantages in throughput and part design accurate control, containment of degradation, reduction of fumes, and yet delivering parts with outstanding chemical resistance.

The present invention hence is directed to a perfluorinated thermoplastic elastomer [polymer (pF-TPE)] comprising:
  at least one elastomeric block (A) consisting of a sequence of recurring units derived from tetrafluoroethylene (TFE) and recurring units derived from at least one perfluorinated monomer other than TFE, and possibly of a minor amount of recurring units derived from at least one bis-olefin [bis-olefin (OF)] of formula $R_A R_B{=}CR_C\text{-}T\text{-}CR_D{=}R_E R_F$,
  wherein $R_A$, $R_B$, $R_C$, $R_D$, $R_E$ and $R_F$, equal to or different from each other, are selected from the group consisting of H, F, Cl, $C_1$-$C_5$ alkyl groups and $C_1$-$C_5$ (per)fluoroalkyl groups, and T is a linear or branched $C_1$-$C_{18}$ alkylene or cycloalkylene group, optionally comprising one or more than one ethereal oxygen atom, preferably at least partially fluorinated, or a (per)fluoropolyoxyalkylene group,
  wherein the molar percentage of recurring units derived from TFE in said block (A) is comprised between 40 and 82% moles, with respect to the total moles of recurring units of the said block (A), and wherein said block (A) possesses a glass transition temperature of less than 25° C., as determined according to ASTM D3418, and
  at least one thermoplastic block (B) consisting of a sequence of recurring units derived from tetrafluoroethylene (TFE) and recurring units derived from at least one perfluorinated monomer other than TFE, wherein the molar percentage of recurring units derived from TFE in said block (B) is comprised between 85 and 98% moles, and wherein the crystallinity of said block (B) and its weight fraction in the polymer (pF-TPE) are such to provide for a heat of fusion of the polymer (pF-TPE) of at least 2.5 J/g, when determined according to ASTM D3418, wherein the said perfluorinated monomer other than TFE is the same in block (A) and block (B).

DESCRIPTION OF EMBODIMENTS

For the purpose of the present invention, the term "elastomeric", when used in connection with the "block (A)" is hereby intended to denote a polymer chain segment which, when taken alone, is substantially amorphous, that is to say, has a heat of fusion of less than 2.0 J/g, preferably of less than 1.5 J/g, more preferably of less than 1.0 J/g, as measured according to ASTM D3418.

For the purpose of the present invention, the term "thermoplastic", when used in connection with the "block (B)", is hereby intended to denote a polymer chain segment which, when taken alone, is semi-crystalline, and possesses a detectable melting point, with an associated heat of fusion of exceeding 10.0 J/g, as measured according to ASTM D3418.

The perfluorinated thermoplastic elastomer [polymer (pF-TPE)] of the invention can be referred to as a block copolymer, said block copolymer typically having a structure comprising at least one block (A) alternated to at least one block (B), that is to say that said polymer (pF-TPE) typically comprises, preferably consists of, one or more than one repeating structures of type (B)-(A)-(B). Generally, the polymer (pF-TPE) has a structure of type (B)-(A)-(B), i.e. comprising a central block (A) having two ends, connected at both ends to a side block (B).

As said, both block (A) and block (B) consist of sequences of recurring units derived from TFE and recurring units derived from at least one perfluorinated monomer other than TFE, wherein the said perfluorinated monomer other than TFE is the same in block (A) and block (B). Recurring units derived from one or more than one perfluorinated monomer other than TFE may be present in each of block (A) and block (B). The said perfluorinated monomer(s) other than TFE are the same in block (A) and block (B) recurring units, which is particularly advantageous to the sake of controlling crystallinity of the blocks.

The expression "perfluorinated", as used herein for characterizing the monomer other than TFE used in block (A) and block (B) is hereby used according to its usual meaning, so as to mean that in said monomer is free from hydrogen atoms and comprises fluorine atoms to saturate valencies.

The said perfluorinated monomer other than TFE is advantageously selected from the group consisting of:
  (a) $C_3$-$C_8$ perfluoroolefins, preferably selected from the group consisting of hexafluoropropylene (HFP) and perfluoroisobutylene (PFIB);
  (b) perfluoroalkylvinylethers (PAVE) of formula $CF_2{=}CFOR_{f1}$, wherein $R_{f1}$ is a $C_1$-$C_6$ perfluoroalkyl group, such as $CF_3$ (PMVE), $C_2F_5$ or $C_3F_7$;
  (c) perfluorooxyalkylvinylethers of formula $CF_2{=}CFOX_0$, wherein $X_0$ is a $C_1$-$C_{12}$ perfluorooxyalkyl group comprising one or more than one ethereal oxygen atom, including notably perfluoromethoxyalkylvinylethers of formula $CF_2{=}CFOCF_2OR_{f2}$, with $R_{f2}$ being a $C_1$-$C_3$ perfluoro(oxy)alkyl group, such as —$CF_2CF_3$, —$CF_2CF_2$—O—$CF_3$ and —$CF_3$; and
  (d) (per)fluorodioxoles of formula:

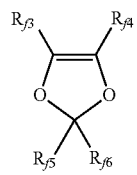

wherein each of $R_{f3}$, $R_{f4}$, $R_{f5}$ and $R_{f6}$, equal to or different from each other, is independently a fluorine atom, a $C_1$-$C_6$ perfluoro(oxy)alkyl group, optionally comprising one or more oxygen atoms, such as —$CF_3$, —$C_2F_5$, —$C_3F_7$, —$OCF_3$ or —$OCF_2CF_2OCF_3$.

Good results have been obtained for embodiments wherein block (A) consisted of a sequence of recurring units derived from TFE and recurring units derived from one or more than one PAVE, as above detailed, and possibly of a minor amount of recurring units derived from at least one bis-olefin (OF), and/or wherein block (B) consisted of a sequence of recurring units derived from TFE and recurring units derived from one or more than one PAVE.

The expression "minor amount" when used hereunder for indicating the amount of recurring units derived from a bis-olefin in a block (A) is intended to denote an amount which is one order of magnitude less (e.g. at least 50 times less) than the amount of recurring units derived from the other monomers, i.e. TFE and the perfluorinated monomer other than TFE, so as not to significantly affect the typical thermal stability and chemical resistance performances due to these latter units.

Should the elastomeric block (A) further comprise recurring units derived from at least one bis-olefin (OF), said block (A) typically further comprises recurring units derived from at least one bis-olefin (OF) in an amount comprised between 0.01% and 1.0% by moles, preferably between 0.03% and 0.5% by moles, more preferably between 0.05% and 0.2% by moles, based on the total moles of recurring units constituting said elastomeric block (A).

The bis-olefin (OF) is preferably selected from the group consisting of those of any of formulae (OF-1), (OF-2) and (OF-3):

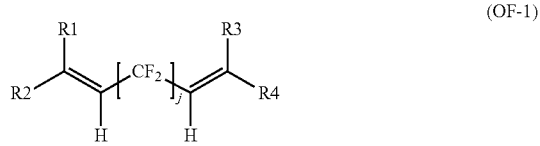
(OF-1)

wherein j is an integer comprised between 2 and 10, preferably between 4 and 8, and R1, R2, R3 and R4, equal to or different from each other, are selected from the group consisting of H, F, $C_1$-$C_5$ alkyl groups and $C_1$-$C_5$ (per)fluoroalkyl groups;

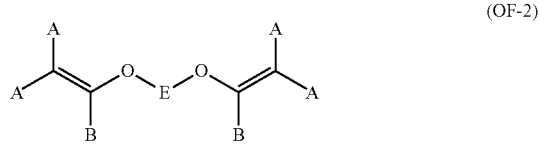
(OF-2)

wherein each of A, equal to or different from each other and at each occurrence, is independently selected from the group consisting of H, F and Cl; each of B, equal to or different from each other and at each occurrence, is independently selected from the group consisting of H, F, Cl and $OR_B$, wherein $R_B$ is a branched or straight chain alkyl group which may be partially, substantially or completely fluorinated or chlorinated, E is a divalent group having 2 to 10 carbon atoms, optionally fluorinated, which may be inserted with ether linkages; preferably E is a —$(CF_2)_m$— group, wherein m is an integer comprised between 3 and 5; a preferred bis-olefin of (OF-2) type is $F_2C$=CF—O—$(CF_2)_5$—O—CF=$CF_2$;

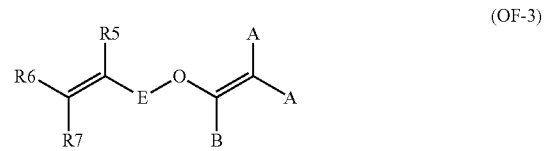
(OF-3)

wherein E, A and B have the same meaning as defined above, R5, R6 and R7, equal to or different from each other, are selected from the group consisting of H, F, $C_1$-$C_5$ alkyl groups and $C_1$-$C_5$ (per)fluoroalkyl groups.

The elastomeric block (A) preferably consists of a sequence of:
recurring units derived from tetrafluoroethylene (TFE) in an amount of 40 to 82% moles, preferably from 50 to 75% moles, and most preferably from 54 to 70% moles;
recurring units derived from at least one perfluorinated monomer other than TFE, as above detailed, in an amount of 18 to 55% moles, preferably from 25 to 48% moles, and most preferably from 30 to 45% moles; and
possibly, recurring units derived from a bis-olefin (OF), as above detailed, in an amount of 0 to 5% moles, preferably of 0 to 2% moles, more preferably of 0 to 1% moles,
with respect to the total moles of recurring units of block (A)

The elastomeric block (A) more preferably consists of a sequence of:
recurring units derived from tetrafluoroethylene (TFE) in an amount of 40 to 82% moles, preferably from 50 to 75% moles, and most preferably from 54 to 70% moles;
recurring units derived from a perfluoroalkylvinylether (PAVE) of formula $CF_2$=$CFOR_{f1}$, wherein $R_{f1}$ is a $C_1$-$C_6$ perfluoroalkyl group, preferably $CF_3$ (PMVE), in an amount of 18 to 55% moles, preferably from 25 to 48% moles, and most preferably from 30 to 45% moles; and
possibly, recurring units derived from a bis-olefin (OF), as above detailed, in an amount of 0 to 5% moles, preferably of 0 to 2% moles, more preferably of 0 to 1% moles,
with respect to the total moles of recurring units of block (A).

The elastomeric block (A) possesses a glass transition temperature of less than 25° C., preferably of less than 20° C., more preferably of less than 15° C., as determined according to ASTM D3418.

The thermoplastic block (B) preferably consists of a sequence of:
recurring units derived from tetrafluoroethylene (TFE) in an amount of 85 to 99.5% moles, preferably from 88 to 97% moles, and most preferably from 90 to 96% moles;
recurring units derived from at least one perfluorinated monomer other than TFE, as above detailed, in an amount of 0.5 to 15% moles, preferably from 3 to 12% moles, and most preferably from 4 to 10% moles,
with respect to the total moles of recurring units of block (B).

The thermoplastic block (B) most preferably consists of a sequence of:
recurring units derived from tetrafluoroethylene (TFE) in an amount of 85 to 98% moles, preferably from 88 to 97% moles, and most preferably from 90 to 96% moles;
recurring units derived from a perfluoroalkylvinylether (PAVE) of formula $CF_2$=$CFOR_{f1}$, wherein $R_{f1}$ is a $C_1$-$C_6$ perfluoroalkyl group, preferably $CF_3$ (PMVE), in an amount of 2 to 15% moles, preferably from 3 to 12% moles, and most preferably from 4 to 10% moles, with respect to the total moles of recurring units of block (B).

The selection of a polymer (pF-TPE) whereas block(s) (A) and block(s) (B) comprise the same perfluorinated monomer other than TFE, and more specifically perfluoromethylvinylether, is particularly advantageous for enabling crystallinity and molecular structure of the block copolymer to be optimized, with no risk of "pollution" from other spurious monomers, so as to provide their peculiar rheological behaviour, including significant shear thinning.

The weight ratio between blocks (A) and blocks (B) in the polymer (pF-TPE) of the invention is typically comprised between 95:5 and 10:90.

According to certain preferred embodiments, the polymers (pF-TPE) comprise a major amount of blocks (A); according to these embodiment's, the polymer (pF-TPE) is characterized by a weight ratio between blocks (A) and blocks (B) of 95:5 to 65:35, preferably 90:10 or even 80:20 to 70:30.

The crystallinity of said block (B) and its weight fraction in the polymer (pF-TPE) are such to provide for a heat of fusion of the polymer (pF-TPE) of at least 2.5 J/g, preferably of at least 3.0 J/g, more preferably of at least 3.5 J/g, when determined according to ASTM D3418.

The presence of a crystalline fraction due to the block (B) in the polymer (pF-TPE) of at least 2.5 J/g has been found as essential for delivering sufficient physical crosslinking in shaped articles made from polymer (pF-TPE) so as to provide acceptable mechanical performances in view of intended fields of use, even in the absence of an additional possible curing step.

Another object of the invention is a method for manufacturing a perfluorinated thermoplastic elastomer, as above detailed.

The method of the invention generally comprises the following sequential steps:

(a) polymerizing TFE, at least one perfluorinated monomer other than TFE, and possibly at least one bis-olefin (OF), in the presence of a radical initiator and of an iodinated chain transfer agent, thereby providing a pre-polymer consisting of at least one block (A) containing one or more iodinated end groups; and (b) polymerizing TFE, at least one perfluorinated monomer other than TFE, in the presence of a radical initiator and of the pre-polymer provided in step (a), thereby providing at least one block (B) grafted on said pre-polymer through reaction of the said iodinated end groups of the block (A).

All the features disclosed in connection with the block (A) of the perfluorinated thermoplastic elastomer of the invention also are characterizing features of the block (A) of step (a).

Similarly, all the features disclosed in connection with the block (B) of the perfluorinated thermoplastic elastomer of the invention also are characterizing features of the block (B) of step (b).

The method of the invention is preferably carried out in aqueous emulsion polymerization according to methods well known in the art, in the presence of a suitable radical initiator.

The radical initiator is typically selected from the group consisting of:

inorganic peroxides such as, for instance, alkali metal or ammonium persulphates, perphosphates, perborates or percarbonates, optionally in combination with ferrous, cuprous or silver salts or other easily oxidable metals;

organic peroxides such as, for instance, disuccinylperoxide, tertbutyl-hydroperoxide, and ditertbutylperoxide; and azo compounds (see, for instance, U.S. Pat. No. 2,515,628 (E.I. DU PONT DE NEMOUS AND CO.) 18 Jul. 1950 and U.S. Pat. No. 2,520,338 (E.I. DU PONT DE NEMOURS AND CO.) 29 Aug. 1950).

It is also possible to use organic or inorganic redox systems, such as persulphate ammonium/sodium sulphite, hydrogen peroxide/aminoiminomethansulphinic acid.

In step (a) of the method of the invention, one or more iodinated chain transfer agents are added to the reaction medium, typically of formula $R_xI_n$, wherein $R_x$ is a $C_1$-$C_{16}$, preferably a $C_1$-$C_8$ (per)fluoroalkyl or a (per)fluorochloroalkyl group, and n is 1 or 2. It is also possible to use as chain transfer agents alkali or alkaline-earth metal iodides, as described in U.S. Pat. No. 5,173,553 (AUSIMONT S.P.A.) 22 Dec. 1992. The amount of the chain transfer agent to be added is established depending on the molecular weight which is intended to be obtained and on the effectiveness of the chain transfer agent itself.

In any of steps (a) and (b) of the method of the invention, one or more surfactants may be used, preferably fluorinated surfactants of formula:

$$R_y-X^-M^+$$

wherein $R_y$ is a $C_5$-$C_{16}$ (per)fluoroalkyl or a (per)fluoropolyoxyalkyl group, $X^-$ is $-COO^-$ or $-SO_3^-$, and $M^+$ is selected from the group consisting of $H^+$, $NH_4^+$, and an alkali metal ion.

Among the most commonly used surfactants, mention can be made of (per)fluoropolyoxyalkylenes terminated with one or more carboxyl groups.

When step (a) is terminated, the reaction is discontinued, for instance by cooling, and the residual monomers are removed, for instance by heating the emulsion under stirring.

The second polymerization step (b) is then carried out, feeding the new monomer mixture and adding fresh radical initiator.

If necessary, under step (b) of the process for the manufacture of the polymer (pF-TPE), one or more further chain transfer agents may be added, which can be selected from the same iodinated chain transfer agents as defined above or from chain transfer agents known in the art for use in the manufacture of fluoropolymers such as, for instance, ketones, esters or aliphatic alcohols having from 3 to 10 carbon atoms, such as acetone, ethylacetate, diethylmalonate, diethylether and isopropyl alcohol; hydrocarbons, such as methane, ethane and butane; chloro(fluoro)carbons, optionally containing hydrogen atoms, such as chloroform and trichlorofluoromethane; bis(alkyl)carbonates wherein the alkyl group has from 1 to 5 carbon atoms, such as bis(ethyl) carbonate and bis(isobutyl) carbonate.

When step (b) is completed, the polymer (pF-TPE) is generally isolated from the emulsion according to conventional methods, such as by coagulation by addition of electrolytes or by cooling.

Alternatively, the polymerization reaction can be carried out in mass or in suspension, in an organic liquid where a suitable radical initiator is present, according to known techniques. The polymerization temperature and pressure can vary within wide ranges depending on the type of monomers used and based on the other reaction conditions.

Step (a) and/or step (b) of process for the manufacture of the polymer (pF-TPE) is typically carried out at a temperature of from −20° C. to 150° C.; and/or typically under pressures up to 10 MPa.

The method of the invention is preferably carried out in aqueous emulsion polymerization in the presence of a microemulsion of perfluoropolyoxyalkylenes, as described in U.S. Pat. No. 4,864,006 (AUSIMONT S.P.A.) 9 May 1989, or in the presence of a microemulsion of fluoropolyoxyalkylenes having hydrogenated end groups and/or hydrogenated recurring units, as described in EP 0625526 A (AUSIMONT S.P.A.) 23 Nov. 1994.

Still, another object of the invention is a method for manufacturing a three-dimensional object [object (3D)] using an additive manufacturing system, comprising:

generating a digital representation of the three-dimensional object, and slicing the same into multiple horizontal layers, so as to generate printing instructions for each of the said horizontal layers;

printing layers of the object (3D) from a part material comprising the polymer (pF-TPE) of the invention.

Techniques for printing the said layers are not particularly limited, and may be selected notably from extrusion-based techniques, jetting, selective laser sintering, powder/binder jetting, electron-beam melting and stereolithography.

Depending upon the printing technique which is used, the part material may be provided under different morphology for being used for printing layers in the additive manufacturing system. For instance, the part material may be provided under the form of loose particles; it may be provided under the form of fluid-state thermally solidifiable material or meltable precursor thereof, or may be provided under the form of a thermosettable liquid solution.

The method may include printing layers of a support structure from a support material, and printing layers of the three-dimensional object from the said part material in coordination with the printing of the layers of the support structure, where at least a portion the printed layers of the support structure support the printed layers of the three-dimensional object, and then removing at least a portion of the support structure for obtaining the object (3D).

The part material may comprise the polymer (pF-TPE) of the invention in combination with other materials/ingredients, or may essentially consist of the said polymer (pF-TPE), being understood that minor amounts (e.g. <1% wt on total part material) of components other than the polymer (pF-TPE) may be present, without these components substantially affecting the performances and the properties of the polymer (pF-TPE).

According to certain preferred embodiments, the printing technique is an extrusion-based technique. According to these embodiment's, the method of the invention comprises:

(i) a step of introducing a supply of the part material comprising (preferably essentially consisting, more preferably consisting of) polymer (pF-TPE) in a fluid state into a flow passage of a discharge nozzle on a mechanically moveable dispensing head, said nozzle having a dispensing outlet at one end thereof in fluid-flow communication with said flow passage;

(ii) dispensing said part material from said dispensing outlet as a continuous, flowable fluid stream at a predetermined temperature above the temperature at which it solidifies onto a base member positioned in close proximity to said nozzle;

(iii) simultaneously with the dispensing of said part material onto said base member, mechanically generating relative movement of said base member and said dispensing head with respect to each other in a predetermined pattern to form a first layer of said material on said base member; and (iv) displacing said dispensing head a predetermined layer thickness distance from said first layer, and (v) after the portion of said first layer adjacent said nozzle has cooled and solidified, dispensing a second layer of said part material in a fluid state onto said first layer from said dispensing outlet while simultaneously moving said base member and said dispensing head relative to each other, whereby said second layer solidifies upon cooling and adheres to said first layer to form a three-dimensional article; and (vi) forming multiple layers of said part material built up on top of the previously generated layer in multiple passes by repeated sequences of steps (i) to (v), as above detailed.

The invention will be now described in more detail with reference to the following examples whose purpose is merely illustrative and not limitative of the scope of the invention.

Example 1

In a 22 litres reactor equipped with a mechanical stirrer operating at 400 rpm, 13.9 l of demineralized water and 139 ml of a microemulsion, previously obtained by mixing 29.2 ml of a perfluoropolyoxyalkylene having acidic end groups of formula: $CF_2ClO(CF_2—CF(CF_3)O)_n(CF_2O)_m CF_2COOH$, wherein n/m=10, having average molecular weight of 600, 9.5 ml of a 30% v/v $NH_4OH$ aqueous solution, 81.8 ml of demineralised water and 18.5 ml of GALDEN® D02 perfluoropolyether of formula: $CF_3O(CF_2CF(CF_3)O)_n(CF_2O)_mCF_3$ with n/m=20, having average molecular weight of 450, were introduced.

Then 6.1 g of 1,4-diiodoperfluorobutane ($C_4F_8I_2$) as chain transfer agent were introduced, and the reactor was heated and maintained at a set-point temperature of 80° C.; a mixture of tetrafluoroethylene (TFE) (38% moles) and perfluoromethylvinylether (MVE) (62% moles) was then added to reach a final pressure of 21 bar (2.1 MPa). 1.39 g of ammonium persulfate (APS) as initiator were then introduced. Pressure was maintained at set-point of 21 bar by continuous feeding of a gaseous mixture of TFE (60% moles) and MVE (40% moles) up to a total of 3000 g. Once 3000 g of monomer mixture were fed in the reactor, the reaction was discontinued by reducing the stirring to 50 rpm and cooling the reactor at room temperature. The stirrer was then stopped and the residual pressure was discharged, and the temperature brought to 75° C. A mixture of tetrafluoroethylene (TFE) (81% moles) and perfluoromethylvinylether (MVE) (19% moles) was then added to reach a final pressure of 21 bar (2.1 MPa). As soon as the mechanical stirrer was set operating at 400 rpm, the reaction started with no need for additional initiator and the pressure was maintained at set-point of 21 bar by continuous feeding of a gaseous mixture of TFE (94% moles) and MVE (6% moles) up to a total of 750 g. Then the reactor was cooled, vented and the latex recovered. The latex was treated with nitric acid, the polymer was separated from the aqueous phase, washed with demineralized water, dried in a convection oven at 130° C. for 16 hours and finally granulated in a twin-extruders to provide pellets. Material characterization data on said pellets are reported in Table 1.

Example 3C of Comparison

In a 7.5 liters reactor equipped with a mechanical stirrer operating at 72 rpm, 4.5 l of demineralized water and 22 ml of a microemulsion, previously obtained by mixing 4.8 ml of a perfluoropolyoxyalkylene having acidic end groups of formula: $CF_2ClO(CF_2—CF(CF_3)O)_n(CF_2O)_mCF_2COOH$, wherein n/m=10, having average molecular weight of 600, 3.1 ml of a 30% v/v $NH_4OH$ aqueous solution, 11.0 ml of demineralized water and 3.0 ml of GALDEN® D02 perfluoropolyether of formula: $CF_3O(CF_2CF(CF_3)O)_n(CF_2O)_mCF_3$ with n/m=20, having average molecular weight of 450, were introduced.

The reactor was heated and maintained at a set-point temperature of 85° C.; a mixture of vinylidene fluoride (VDF) (78.5% moles) and hexafluoropropene (HFP) (21.5% moles) was then added to reach a final pressure of 20 bar. Then 8 g of 1,4-diiodioperflurobutane ($C_4F_8I_2$) as chain transfer agent were introduced, and 1.25 g of ammonium persulfate (APS) as initiator were introduced. Pressure was maintained at set-point of 20 bar by continuous feeding of a gaseous mixture of vinylidene fluoride (VDF) (78.5% moles) and hexafluoropropene (HFP) (21.5% moles) up to a total of 2000 g. Moreover, 0.86 g of $CH_2=CH—(CF_2)_6—CH=CH_2$, fed in 20 equivalent portions each 5% increase in conversion were introduced. Once 2000 g of monomer mixture were fed in the reactor, the reaction was discontinued by cooling the reactor at room temperature. The residual pressure was then discharged and the temperature brought to 80° C. VDF was then fed into the autoclave up to a pressure of 20 bar, and 0.14 g of ammonium persulfate (APS) as initiator were introduced. Pressure was maintained at set-point of 20 bar by continuous feeding of VDF up to a total of 222 g. Then the reactor was cooled, vented and the latex recovered. The latex was treated with aluminum sulphate, separated from the aqueous phase, washed with demineralized water, dried in a convection oven at 90° C. for 16 hours, and finally granulated in a twin-extruders to provide pellets. Material characterization data on said pellets are reported in Table 1.

Characterization of Materials Produced in the Examples

Determination of Thermal Properties

Thermal properties have been determined by differential scanning calorimetry pursuant to ASTM D3418 standard.

The weight loss at a given temperature Tx was measured by heating the sample in a thermogravimetric analyser (Perkin Elmer TGA7) at a heating rate of 10° C./min under a 30 mL/min flux of dry air.

Determination of Rheological Properties

Rheological tests have been performed according to ASTM D4440 standard, using an Anton Paar MCR502 rheogoniometer with parallel plates geometry (25 mm diameter; gap between 1 and 2 mm). Maximum strain amplitude has been set within linear viscoelastoc range of the specimen submitted to test via a preliminary automated strain sweep. Isothermal frequency sweep in the range 0.05 to 100 rad/sec at temperatures T* slightly exceeding melting point of the specimen submitted to test ($T_m$+10° C.<T*<$T_m$+15° C.) were performed, and complex viscosities' values recorded.

TABLE 1

|  |  | Ex. 1 | Ex. 2C(#) | Ex. 3C | Ex. 4C(*) |
|---|---|---|---|---|---|
|  |  | DSC data | | | |
| $T_g$ | [° C.] | −1.5 | n.a. | −21.5 | n.a. |
| $T_m$ | [° C.] | 243.4 | 270 | 165 | 170 |

TABLE 1-continued

|  |  | Ex. 1 | Ex. 2C(#) | Ex. 3C | Ex. 4C(*) |
|---|---|---|---|---|---|
|  |  | DSC data | | | |
| $\Delta H_m$ | [J/g] | 4.0 | n.a. | 7.0 | n.a. |
| Recurring units |  | block (A) | block (B) | random | block (A) | block (B) | homo |
| fraction | [% wt] | 75 | 25 | n.a. | 90 | 10 | n.a. |
| VDF | [% mol] | — | — | — | 78.5 | 100 | 100 |
| HFP | [% mol] | — | — | — | 21.5 | — | — |
| TFE | [% mol] | 60 | 93 | 93 | — | — | — |
| MVE | [% mol] | 40 | 7 | 7 | — | — | — |

(#)Commercially available HYFLON ® MFA 940 (TFE: about 93% moles; MVE: about 7% moles), and $T_m$ = 255° C., under the form of pellets;
(*)commercially available SOLEF ® 1013 PVDF homopolymer, having MFI = 2.5 g/10 min (230° C./10 kg) and $T_m$ = 170° C., under the form of pellets.

Rheological properties of polymer of Ex. 1 and Ex. 2C are summarized in the following table, and sketched in Figure 1.

Rheological data have been obtained at a temperature slightly exceeding melting temperature of the polymer of Ex. 1 and Ex. 2C, respectively.

TABLE 2

| Complex viscosity (Pa × sec) | Ex. 1 | Ex. 2C |
|---|---|---|
| $T_m$ (° C.) | 240° C. | 255° C. |
| T* (° C.) | 250° C. | 270° C. |
| T* − $T_m$ (° C.) | 10° C. | 15° C. |
| $\eta^*_{1\ rad/sec}$ | 890 | 850 |
| $\eta^*_{10\ rad/sec}$ | 678 | 750 |
| $\eta^*_{100\ rad/sec}$ | 506 | 598 |
| $\eta^*_{1\ rad/sec}/\eta^*_{100\ rad/sec}$ | 1.8 | 1.4 |

Thermal stability of material of Ex. 1 and Ex. 2C was measured by TGA determining weight loss at a temperature of 300° C.; for both materials, the weight loss at 300° C. was found to be less than 0.1% wt, thus confirming that these materials have substantially similar thermal resistance in the range of temperatures which is of interest in the hereby concerned field of use.

The data comprised in Table above clearly show that contrarily to corresponding thermoplast of similar monomer composition, the present perfluorinated thermoplastic elastomer possesses increased shear thinning. In other terms, while possessing at shear rates of about 100 rad/sec (which are those encountered, e.g., in the die of a fused filament forming device) similar to the corresponding thermoplasts, have significantly higher viscosity at lower shear rates, such as those encountered in the deposition of melt flow onto a growing 3D part.

This behaviour is peculiar to the perfluorinated thermoplastic elastomers of the present invention, including recurring units derived from same perfluorinated monomer in both blocks, and possessing the given crystallinity properties; when comparing rheological behaviour of vinylidene fluoride-containing counterparts, while it has to be admitted that both the thermoplast and the corresponding thermoplastic elastomer are endowed with significant shear thinning, this non-newtonian behaviour is even more significant in the thermoplast material per se, than in the corresponding thermoplastic elastomer. Nevertheless, these materials have no outstanding thermal and chemical resistance, so that they cannot be used for prototyping parts conceived for highly demanding conditions of use.

TABLE 3

| Complex viscosity (Pa × sec) | Ex. 3C | Ex. 4C |
|---|---|---|
| $T_m$ (° C.) | 165° C. | 170° C. |
| $T^*$ (° C.) | 200° C. | 200° C. |
| $T^* - T_m$ (° C.) | 35° C. | 30° C. |
| $\eta^*_{1\ rad/sec}$ | 7057 | 43277 |
| $\eta^*_{10\ rad/sec}$ | 2556 | 12129 |
| $\eta^*_{100\ rad/sec}$ | 926 | 2996 |
| $\eta^*_{1\ rad/sec}/\eta^*_{100\ rad/sec}$ | 7.6 | 14.4 |

The invention claimed is:
1. A perfluorinated thermoplastic elastomer comprising:
at least one elastomeric block (A) consisting of a sequence of recurring units derived from tetrafluoroethylene (TFE) and recurring units derived from at least one perfluorinated monomer other than TFE, and recurring units derived from at least one bis-olefin (OF) of formula $R_AR_B=CR_C\text{-}T\text{-}CR_D=R_ER_F$ in an amount of 0 to 5% moles, with respect to the total moles of recurring units of block (A),
wherein $R_A$, $R_B$, $R_C$, $R_D$, $R_E$ and $R_F$, equal to or different from each other, are selected from the group consisting of H, F, Cl, $C_1\text{-}C_5$ alkyl groups and $C_1\text{-}C_5$ (per)fluoroalkyl groups, and T is a linear or branched $C_1\text{-}C_{18}$ alkylene or cycloalkylene group, wherein the molar percentage of recurring units derived from TFE in block (A) is comprised between 40 and 82% moles, with respect to the total moles of recurring units of said block (A), and
wherein said block (A) possesses a glass transition temperature of less than 25° C., as determined according to ASTM D3418, and
at least one thermoplastic block (B) consisting of a sequence of recurring units derived from tetrafluoroethylene (TFE) and recurring units derived from at least one perfluorinated monomer other than TFE,
wherein the molar percentage of recurring units derived from TFE in block (B) is comprised between 85 and 99.5% moles, and
wherein a crystallinity of said block (B) and its weight fraction in polymer (pF-TPE) are such to provide for a heat of fusion of the polymer (pF-TPE) of at least 2.5 J/g, when determined according to ASTM D3418,
wherein said perfluorinated monomer other than TFE is the same in block (A) and block (B).
2. The perfluorinated thermoplastic elastomer of claim 1, wherein the perfluorinated monomer other than TFE is selected from the group consisting of:
(a) $C_3\text{-}C_8$ perfluoroolefins;
(b) perfluoroalkylvinylethers (PAVE) of formula $CF_2=CFOR_{f1}$, wherein $R_{f1}$ is a $C_1\text{-}C_6$ perfluoroalkyl group;
(c) perfluorooxyalkylvinylethers of formula $CF_2=CFOX_0$, wherein $X_0$ is a $C_1\text{-}C_{12}$ perfluorooxyalkyl group comprising one or more than one ethereal oxygen atom; and
(d) (per)fluorodioxoles of formula:

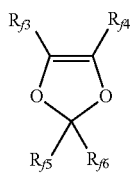

wherein each of $R_{f3}$, $R_{f4}$, $R_{f5}$ and $R_{f6}$, equal to or different from each other, is independently a fluorine atom or a $C_1\text{-}C_6$ perfluoro(oxy)alkyl group comprising one or more oxygen atoms.
3. The perfluorinated thermoplastic elastomer according to claim 1, wherein bis-olefin (OF) is selected from the group consisting of those of any of formulae OF-1, OF-2 and OF-3:

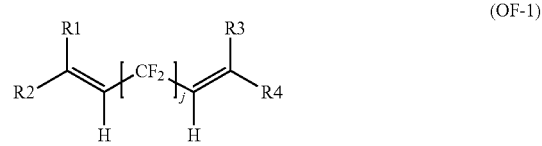

wherein j is an integer comprised between 2 and 10, and R1, R2, R3 and R4, equal to or different from each other, are selected from the group consisting of H, F, $C_1\text{-}C_5$, alkyl groups and $C_1\text{-}C_5$ (per)fluoroalkyl groups;

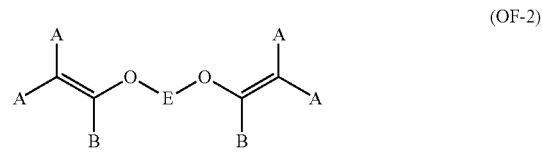

wherein each of A, equal to or different from each other and at each occurrence, is independently selected from the group consisting of H, F and Cl; each of B, equal to or different from each other and at each occurrence, is independently selected from the group consisting of H F, Cl and $OR_B$, wherein $R_B$ is a branched or straight chain alkyl group
wherein E, A and B have the same meaning as defined above, R5, R6 and R7, equal to or different from each other, are selected from the group consisting of H, F, $C_1\text{-}C_5$ alkyl groups and $C_1\text{-}C_5$ (per)fluoroalkyl groups.
4. The perfluorinated thermoplastic elastomer according to claim 1,
wherein the elastomeric block (A) consists of a sequence of:
recurring units derived from tetrafluoroethylene (TFE) in an amount of 40 to 82% moles;
recurring units derived from at least one perfluorinated monomer other than TFE in an amount of 18 to 55% moles; and
recurring units derived from bis-olefin (OF), in an amount of 0 to 5% moles,
with respect to the total moles of recurring units of block (A).
5. The perfluorinated thermoplastic elastomer of claim 4, wherein the elastomeric block (A) consists of a sequence of:
recurring units derived from tetrafluoroethylene (TFE) in an amount of 40 to 82% moles;
recurring units derived from a perfluoroalkylvinylether (PAVE) of formula $CF_2=CFOR_{f1}$, wherein $R_{f1}$ is a $C_1\text{-}C_6$ perfluoroalkyl group, in an amount of 18 to 55% moles; and
recurring units derived from bis-olefin (OF), in an amount of 0 to 5% moles,
with respect to the total moles of recurring units of block (A).

6. The perfluorinated thermoplastic elastomer according to claim 1, wherein the thermoplastic block (B) consists of a sequence of:
recurring units derived from tetrafluoroethylene (TFE) in an amount of 85 to 99.5% moles; and
recurring units derived from at least one perfluorinated monomer other than TFE, in an amount of 0.5 to 15% moles,
with respect to the total moles of recurring units of block (B).

7. The perfluorinated thermoplastic elastomer of claim 6, wherein the thermoplastic block (B) consists of a sequence of:
recurring units derived from tetrafluoroethylene (TFE) in an amount of 85 to 98% moles; and
recurring units derived from a perfluoroalkylvinylether (PAVE) of formula $CF_2=CFOR_{f1}$, wherein $R_{f1}$ is a $C_1$-$C_6$ perfluoroalkyl group in an amount of 2 to 15% moles,
with respect to the total moles of recurring units of block (B).

8. The perfluorinated thermoplastic elastomer according to claim 1, wherein said polymer (pF-TPE) is characterized by a weight ratio between block(s) (A) and block(s) (B) of 95:5 to 65:35.

9. A method for manufacturing a perfluorinated thermoplastic elastomer according to claim 1, said method comprising the following sequential steps:
(a) polymerizing TFE and at least one perfluorinated monomer other than TFE, in the presence of a radical initiator and of an iodinated chain transfer agent, thereby providing a pre-polymer consisting of at least one block (A) of claim 1 containing one or more iodinated end groups; and
(b) polymerizing TFE and at least one perfluorinated monomer other than TFE, in the presence of a radical initiator and of the pre-polymer provided in step (a), thereby providing at least one block (B) grafted on said pre-polymer through reaction of said iodinated end groups of the block (A), and thereby forming the perfluorinated thermoplastic elastomer.

10. A method for manufacturing a three-dimensional object using an additive manufacturing system, comprising:
generating a digital representation of the three-dimensional object, and slicing the same into multiple horizontal layers, so as to generate printing instructions for each of said horizontal layers;
printing layers of the object (3D) from a part material comprising a perfluorinated thermoplastic elastomer according to claim 1.

11. The method of claim 10, wherein a technique for printing said layers is selected from the group consisting of extrusion-based techniques, jetting, selective laser sintering, powder/binder jetting, electron-beam melting and stereolithography.

12. The method of claim 10, said method further comprising printing layers of a support structure from a support material, and printing layers of the three-dimensional object from said part material in coordination with the printing of the layers of the support structure, where at least a portion the printed layers of the support structure support the printed layers of the three-dimensional object, and then removing at least a portion of the support structure for obtaining the object (3D).

13. The method of claim 10, said method comprising:
(i) introducing a supply of part material comprising polymer (pF-TPE) in a fluid state into a flow passage of a discharge nozzle on a mechanically moveable dispensing head, said nozzle having a dispensing outlet at one end thereof in fluid-flow communication with said flow passage;
(ii) dispensing said part material from said dispensing outlet as a continuous, flowable fluid stream at a predetermined temperature above the temperature at which it solidifies onto a base member positioned in close proximity to said nozzle;
(iii) simultaneously with the dispensing of said part material onto said base member, mechanically generating relative movement of said base member and said dispensing head with respect to each other in a predetermined pattern to form a first layer of said material on said base member; and
(iv) displacing said dispensing head a predetermined layer thickness distance from said first layer, and
(v) after the portion of said first layer adjacent said nozzle has cooled and solidified, dispensing a second layer of said part material in a fluid state onto said first layer from said dispensing outlet while simultaneously moving said base member and said dispensing head relative to each other, whereby said second layer solidifies upon cooling and adheres to said first layer to form a three-dimensional article; and
(vi) forming multiple layers of said part material built up on top of the previously generated layer in multiple passes by repeated sequences of steps (i) to (v), as above detailed.

14. The perfluorinated thermoplastic elastomer of claim 2, wherein the perfluorinated monomer other than TFE is selected from the group consisting of: hexafluoropropylene (HFP); perfluoroisobutylene (PFIB); perfluoroalkylvinylethers of formula $CF_2=CFOR_{f1}$, wherein $R_{f1}$ is $CF_3$, $C_2F_5$ or $C_3F_7$; perfluorooxyalkylvinyl-ethers of formula $CF_2=CFOCF_2OR_{f2}$, wherein $R_{f2}$ is $-CF_2CF_3$, $-CF_2CF_2-O-CF_3$ or $-CF_3$; and (per)fluorodioxoles of formula:

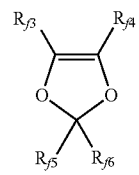

wherein each of $R_{f3}$, $R_{f4}$, $R_{f5}$ and $R_{f6}$, equal to or different from each other, is independently $-F$, $-CF_3$, $-C_2F_5$, $-C_3F_7$, $-OCF_3$ or $-OCF_2CF_2OCF_3$.

15. The perfluorinated thermoplastic elastomer according to claim 3, wherein bis-olefin (OF) is $F_2C=CF-O-(CF_2)_5-O-CF=CF_2$.

16. The perfluorinated thermoplastic elastomer according to claim 4, wherein the elastomeric block (A) consists of a sequence of:
recurring units derived from tetrafluoroethylene (TFE) in an amount of 54 to 70% moles;
recurring units derived from at least one perfluorinated monomer other than TFE in an amount of 30 to 45% moles; and
recurring units derived from a bis-olefin (OF), in an amount of 0 to 1% moles,
with respect to the total moles of recurring units of block (A).

17. The perfluorinated thermoplastic elastomer of claim 16, wherein the elastomeric block (A) consists of a sequence of:
recurring units derived from tetrafluoroethylene (TFE) in an amount of 54 to 70% moles;
recurring units derived from a perfluoroalkylvinylether (PAVE) of formula $CF_2=CFOR_{f1}$, wherein $R_{f1}$ is $CF_3$ in an amount of 30 to 45% moles; and
recurring units derived from a bis-olefin (OF) in an amount of 0 to 1% moles,
with respect to the total moles of recurring units of block (A).

18. The perfluorinated thermoplastic elastomer according to claim 6, wherein the thermoplastic block (B) consists of a sequence of:
recurring units derived from tetrafluoroethylene (TFE) in an amount of 90 to 96% moles; and
recurring units derived from at least one perfluorinated monomer other than TFE in an amount of 4 to 10% moles,
with respect to the total moles of recurring units of block (B).

19. The perfluorinated thermoplastic elastomer of claim 18, wherein the thermoplastic block (B) consists of a sequence of:
recurring units derived from tetrafluoroethylene (TFE) in an amount of 90 to 96% moles; and
recurring units derived from a perfluoroalkylvinylether (PAVE) of formula $CF_2=CFOR_{f1}$, wherein $R_{f1}$ is $CF_3$ in an amount of 4 to 10% moles,
with respect to the total moles of recurring units of block (B).

20. The perfluorinated thermoplastic elastomer according to claim 8, wherein said polymer (pF-TPE) is characterized by a weight ratio between block(s) (A) and block(s) (B) of 80:20 to 70:30.

21. The perfluorinated thermoplastic elastomer according to claim 1, wherein T is a linear or branched $C_1$-$C_{18}$ alkylene or cycloalkylene group, comprising one or more than one ethereal oxygen atom.

22. The perfluorinated thermoplastic elastomer according to claim 1, wherein T is a linear or branched $C_1$-$C_{18}$ alkylene or cycloalkylene group, comprising at least partially fluorinated, or a (per)fluoropolyoxyalkylene group.

23. The perfluorinated thermoplastic elastomer according to claim 3, wherein $R_B$ is a branched or straight chain alkyl group which is partially or completely fluorinated or chlorinated, and E is a divalent group having 2 to 10 carbon atoms, fluorinated and comprising ether linkages OF-3

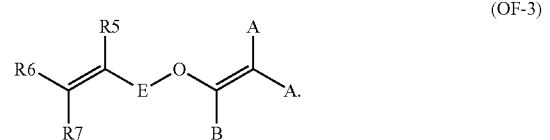

(OF-3)

24. The method of claim 9, wherein the step (a) comprises polymerizing TFE, at least one perfluorinated monomer other than TFE, and at least one bis-olefin (OF), in the presence of a radical initiator and of an iodinated chain transfer agent, thereby providing a pre-polymer consisting of at least one block (A) containing one or more iodinated end groups.

* * * * *